United States Patent

Nagase et al.

[11] Patent Number: 5,887,095
[45] Date of Patent: Mar. 23, 1999

[54] OPTICAL RECEPTACLE AND HOUSING THEREFOR

[75] Inventors: Ryo Nagase; Shin-ichi Iwano, both of Mito, Japan

[73] Assignee: Nippon Telegraph & Telephone Corporation, Tokyo, Japan

[21] Appl. No.: 48,778

[22] Filed: Mar. 26, 1998

Related U.S. Application Data

[62] Division of Ser. No. 611,779, Mar. 6, 1996.

[51] Int. Cl.$^6$ ............................. G02B 6/36; G02B 6/00
[52] U.S. Cl. ............................................. 385/58; 385/147
[58] Field of Search .................................. 385/58, 59, 65, 385/55, 66, 70, 72, 77, 78, 139, 83

[56] References Cited

U.S. PATENT DOCUMENTS

| | | |
|---|---|---|
| 4,140,365 | 2/1979 | Burger et al. . |
| 4,415,232 | 11/1983 | Caron . |
| 4,418,983 | 12/1983 | Bowen et al. . |
| 4,477,146 | 10/1984 | Bowen et al. . |
| 5,373,574 | 12/1994 | Marazzi . |
| 5,542,015 | 7/1996 | Hultermans ............................... 385/60 |
| 5,737,463 | 4/1998 | Weiss et al. ............................... 385/59 |
| 5,748,818 | 5/1998 | Weiss et al. ............................... 385/59 |
| 5,774,611 | 6/1998 | Nagase et al. ............................ 385/58 |

FOREIGN PATENT DOCUMENTS

| | | |
|---|---|---|
| 56-89709 | 7/1981 | Japan . |
| 64-6441 | 3/1989 | Japan . |
| WO 94/24594 | 10/1994 | WIPO . |

OTHER PUBLICATIONS

Connectors for Optical Fibres and Cables; Part 14: Sectional specification for fibre optic connector–Type SC. CEI/IEC 874-14:1993; pp. 5–21, Jun., 1993.

SC–Type Single–Mode Optical Fiber Connectors, E. Sugita et al., Journal of Lightwave Technology, vol. 7, No. 11, Nov. 1989, pp. 1869–1696.

Simplified SC–Type Receptacles for Optical Subscriber Systems; R. Nagase et al., Proc. 21st European Cont. on Opt. Comm. (ECOC 1995–Brussels), pp. 421–424.

Simplified SC–Type 8–Port Receptacles for Fiber Termination Modules, R. Nagase et al., Proceedings of the 1995 Electronics Society Conference of IEICI, p. 191, Aug. 15, 1995 (English translation).

*Primary Examiner*—Akm E. Ullah
*Attorney, Agent, or Firm*—Frishauf, Holtz, Goodman, Langer & Chick, P.C.

[57] ABSTRACT

An optical receptacle includes a housing having a base end and a nose end. From the base end of the housing is fitted the first ferrule. A split sleeve is provided in the housing. In the split sleeve is fitted the second ferrule of an optical fiber connector plug to be connected to the nose base side of the housing so that the first and second ferrules are aligned with each other. At the base end of the housing are provided first hook portions for holding the first ferrule while at the nose end are provided a fitting portion for fitting an optical fiber connector and second hook portions for holding the optical fiber connector plug in the fitting position thereof. The housing includes an inner part and an outer part having fixed therein the inner part. The inner part is composed of the first and second hook portions integrally molded. The outer part holds the optical fiber connector plug and hold therein the inner part fixedly. The optical receptacle has a simplified structure without adverse affect on the function of the device, thus achieving down-sizing and reduction in weight.

4 Claims, 11 Drawing Sheets

OPTICAL RECEPTACLE AND HOUSING THEREFOR

This application is a divisional application of Ser. No. 08/611,779 filed on Mar. 6, 1996.

BACKGROUND OF THE INVENTION

1. Field of the Invention

The present invention relates to an optical receptacle and a method for manufacturing the same. More particularly, the present invention relates to an optical receptacle which is applied advantageously to connecting parts between a device having incorporated therein an input or output circuit, such as an ONU (optical network unit) module, and an optical fiber connector plug fitted to an outer optical cord as well as to a method for manufacturing the same.

2. Description of Related Art

Optical connectors which are used for connecting optical fibers include IEC 1754-4 "Type SC Connector Family" prescribed in "JIS C-5973" (1990). This connector is generally called "SC-type optical fiber connector" and used widely in optical transmission systems. At their input and output portions for inputting and outputting optical signals, SC type optical fiber connectors couples detachably optical devices such as photo diodes (hereafter, sometimes referred to as "PD") or laser diodes (hereafter, sometimes referred to as "LD") with optical fibers. optical receptacles are optical components which connect the optical connectors with optical fiber connector plugs that are fitted on one hand to a device having input and output circuits for optical signals and on the other hand. to an optical fiber connector plug.

FIG. 1 shows schematically a conventional "SC-type optical receptacle". As shown in FIG. 1, a conventional optical receptacle 101 has an interface equivalent to an adapter in SC-type optical connectors. A housing 102 includes a substrate 107, to which a precision sleeve 103 is fixed, and a hook portion 104 and an outer shell 106. From a terminal end of the housing 102 are inserted a lens 108 and an optical element 109 such as PD or LD.

In the case of the above-described conventional optical receptacle, the lens 108 and the optical element 109 are arranged coaxially with the center axis of the precision sleeve 103 so that the optical axis of an optical fiber is aligned to that of the element to which the optical fiber is to be connected. When a single mode optical fiber is used, not only high precision alignment with the precision sleeve 103, the optical element 109 and so on is required but also the precision sleeve 103 itself must be fabricated with high precision, thus increasing the manufacturing cost of the optical receptacle.

On the other hand, it is sometimes the case that optical elements can be coupled with satisfactory working efficiency through fibers fitted to the optical elements in advance. In the case where an optical fiber is to be connected to an optical waveguide instead of an optical element itself, it is difficult to attach an optical receptacle directly to an end surface of the optical waveguide.

In order to connect a pig-tail optical fiber, which is fitted to an optical circuit, to an optical cord detachably, it is advantageous to attach an optical connector to each optical fiber and connect the fibers through an adapter since this approach is most excellent in workability and gives good connection characteristics.

As such an optical connector, there can be used widely the above-described SC-type optical fiber connectors.

FIG. 2 is a partial cross sectional view showing a conventional SC-type optical fiber connector. FIG. 3 is an exploded view of a conventional SC-type optical fiber connector adapter and a conventional SC-type optical fiber connector plug, corresponding to the part A shown in FIG. 2.

As shown in FIG. 2, input and output portions of an optical module can be fabricated, for example, by attaching, to a tip portion of an optical fiber pigtail, an SC-type optical fiber connector 202 and connecting the SC-type optical fiber connector 208 to an SC-type optical fiber adapter 203 which is fitted to a panel portion of the optical module (not shown). In this case, the SC-type optical fiber adapter 203 has two housings 204 within each of which a sleeve 205 and hooks 206 are provided. In the sleeve 205 which is fitted in the housing 204 is held a split sleeve 211 as shown in FIG. 3. The optical fiber connector 208 includes the coupling device 202 one end of which can be fitted in the SC-type optical fiber adapter 203 and the other end thereof is inserted an outer shell 212. A ferrule 209 is pressed into the outer shell by a spring 213 which is supported by an inner shell 214 over which a crimp ring 215 covers. The crimp ring 215 together with an intervening ring 216 are contained in a boot 217, which is connected to the tension member and coating of an optical fiber cord 201. The outer shell 212, the ferrule 209, the spring 213, the inner shell 214, the crimp ring 215, the ring 216 are coaxially aligned and contained within the inner cavity of the coupling device 202.

Connection to an optical fiber cable outside the optical module can be achieved by engaging the optical fiber connector plug 208 in the housing 204 such that the ferrule 209 is inserted in a split sleeve 211 and the housing 210 of the plug 208 to is clamped by the hooks 206 so that the plug 208, is prevented from rearward movement and thus does not come out of the housing 204.

As described above, the SC-type optical fiber connector shown in FIG. 2 is of a dual engagement structure. More particularly, the ferrule 209 floats within the cavity of the plug housing 210. The plug housing 210 and the sleeve 205 engage with each other. On the other hand, the ferrule 209 and the split sleeve 211 engage with each other. The sleeve 205 and the split sleeve 211 engage with the respective counterparts independently of each other. Due to this dual engagement, the SC-type optical fiber connector is resistant to tension or bending urged to the optical cord from outside. If such an outer force is applied to the connector, the connector is given substantially no adverse effect on its connecting characteristics. As shown in FIG. 3, the conventional SC-type optical fiber adapter and the SC-type optical fiber connector plug together comprise thirteen (13) components. The SC-type optical fiber connector plug is prescribed As is well known, SC-type optical fiber connectors are used under various conditions. For example, in some applications, the optical cord receives no outer force inside the optical module to which it is connected. Therefore, in such an environment where no outer force is urged, it is wasteful to use the above-described SC-type optical fiber connector. Much less, the use of SC-type optical fiber connectors is disadvantageous in view of production costs, space required for fitting it.

SUMMARY OF THE INVENTION

An object of the present invention is to solve the above-described problems and provide an optical receptacle which is of a simple structure and less expensive as well as a method for manufacturing such an optical receptacle.

According to the first aspect, the present invention provides an optical receptacle which comprises:

a housing having a base end and a nose end, the housing comprising an inner part and an outer part having fixed therein the inner part;

a first ferrule fitted to the base end of the housing;

wherein the inner part comprises:

a sleeve for fitting with alignment to the first ferrule and a second ferrule in an optical fiber connector to be connected to the nose end of the housing;

first hook portions for holding the first ferrule provided at the base end of the housing;

second hook portions for holding the optical fiber connector plug at a fitting position of the optical fiber connector plug;

the first and second hook portions being parts of an integral molded article.

Here, the housing may comprise a fixing mechanism which fixes the inner part in position when the inner part is inlayed in the outer part.

The housing may comprise a fixing mechanism which fixes the inner part in position when the inner part is inlayed in the outer part from a side where the first ferrule is positioned.

The first ferrule may comprise a flange having an octagonal prism portion coaxial with the first ferrule and a tetragonal prism portion coaxial with the first ferrule continuing to the octagonal prism portion.

The octagonal prism portion may engage with the first hook portions.

The first hook portions may have respective claws;

wherein the octagonal prism may have two parallel surfaces arranged along a longitudinal axis of the ferrule at a distance larger than a gap defined between inner surfaces of the claws of the first hook portions; and wherein the tetragonal prism portion may have two parallel surfaces at a distance is smaller than the gap between the inner surfaces of the claws of the first hook portions and a diagonal line of the tetragonal prism portion has a length which is equal to or larger than the distance between the two parallel surfaces of the octagonal prism portion.

The diagonal line of the octagonal prism portion may have a length such that the first ferrule is allowed to rotate in the inner part of the housing.

According to the second aspect, the present invention provides a method for manufacturing an optical receptacle as claimed in claim 1, which comprises the steps of:

providing an inner part having first hook portions and second hook portions as an integral molded article;

providing an outer part adapted for holding the inner part therein;

inserting the inner part in the outer part to form a housing; and fitting a first ferrule to a base end of the housing.

Here, the inner part may be inserted in the outer part until a fixing mechanism provided in the housing fixes the inner part in position in the outer part.

According to the third aspect, the present invention provides a housing for an optical receptacle, having a base end adapted for fitting a first ferrule and a nose end adapted for fitting an optical fiber connector plug, the housing comprising:

an inner part an outer part having fixed therein the inner part;

wherein the inner part comprises:

first hook portions for holding the first ferrule provided at the base end of the housing;

second hook portions for holding the optical fiber connector plug at a fitting position of the optical fiber connector plug;

the first and second hook portions being parts of an integral molded article.

Here, the housing may comprise a fixing mechanism which fixes the inner part in position when the inner part is inlayed in the outer part.

The housing may comprise a fixing mechanism which fixes the inner part in position when the inner part is inlayed in the outer part from a side where the first ferrule is positioned.

The fixing mechanism may fix the inner part in position when the inner part is inlayed in the outer part from a side where the first ferrule is positioned.

According to the fourth aspect, the present invention provides a method for manufacturing a housing for an optical receptacle as claimed in claim 1, comprising the steps of:

providing an inner part having first hook portions and second hook portions as an integral molded article;

providing an outer part adapted for holding the inner part therein;

inserting the inner part in the outer part to form a housing.

Here, the inner part may be inserted in the outer part until a fixing mechanism provided in the housing fixes the inner part in position in the outer part.

The above and other objects, effects, features and advantages of the present invention will become more apparent from the following description of the embodiment thereof taken in conjunction with the accompanying drawings.

DETAILED DESCRIPTION OF THE INVENTION

According to the present invention, the housing inlays the inner and outer parts therein to give a fixed structure so that no additional operation such as ultrasonic welding or the like is needed upon assembling the housing. This simplifies assembling operation greatly.

The inner part can be inserted into the outer part from the side where a terminal or base end of the first ferrule is positioned in the outer part (cf. FIGS. 8A and 8B) and inlayed and fixed in the outer part. As a result, even if undesirable tensile force is urged onto the optical fiber cable to which the first ferrule is attached, the inlayed portion of the inner part will not disengage from and come out of the outer part.

Furthermore, the first ferrule has a flange of an octagonal prism in shape coaxial with the axis of the first ferrule. The octagonal prism continues to a tetragonal prism coaxial with the axis of the first ferrule. The first hooks engage with the octagonal prism, two opposite parallel side surfaces of the octagonal prism are spaced apart from each other at a distance which is larger than the gap between the inner surfaces of the claws of the first hooks. The two opposite parallel side surfaces of the tetragonal prism are spaced apart from each other at a distance is smaller than the gap between the inner surfaces of the claws of the first hooks. Furthermore, The diagonal line has a length equal to or slightly greater than the distance between the parallel side surfaces of the octagonal prism. This construction allows the first ferrule to be released from the engagement with the inner part of the housing simply by being rotated by an angle of 45°. Therefore, the optical receptacle of the present invention can be handled without difficulty.

The first ferrule held at the base portion of the housing by the first hooks is fitted in a split sleeve while in the optical fiber connector plug connected to the housing at its nose end, the second ferrule is fitted in the split sleeve so that it is aligned and held at the position of fitting by the second hooks. With this simple construction, optical characteristics equivalent to those obtained with the conventional structure can be secured.

The first hooks for engaging with the first ferrule and the second hooks for engaging with the optical fiber connector plug are molded integrally (i.e., solidly or as one-piece) as an inner part so that the relationship between the positions of the first and second ferrules at the time of coupling can readily be maintained with high precision without high precision assembling operations. As a result, a spring which has been conventionally required to press the first ferrule may be eliminated. Without springs, the first and second ferrules to be connected can firmly be pressed against each other so that the reliability in connecting characteristics can be increased.

Figure 1:
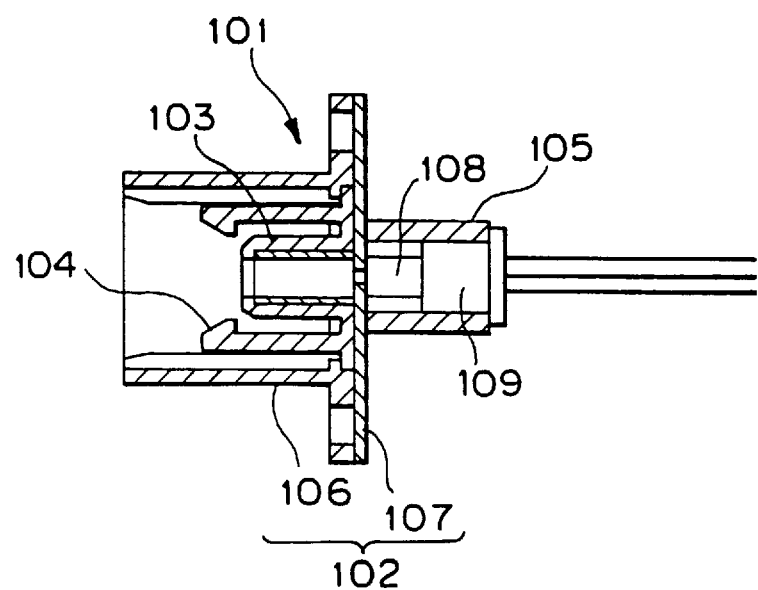
FIG. 1 s a cross sectional view showing a conventional SC-type optical receptacle.
Figure 2:
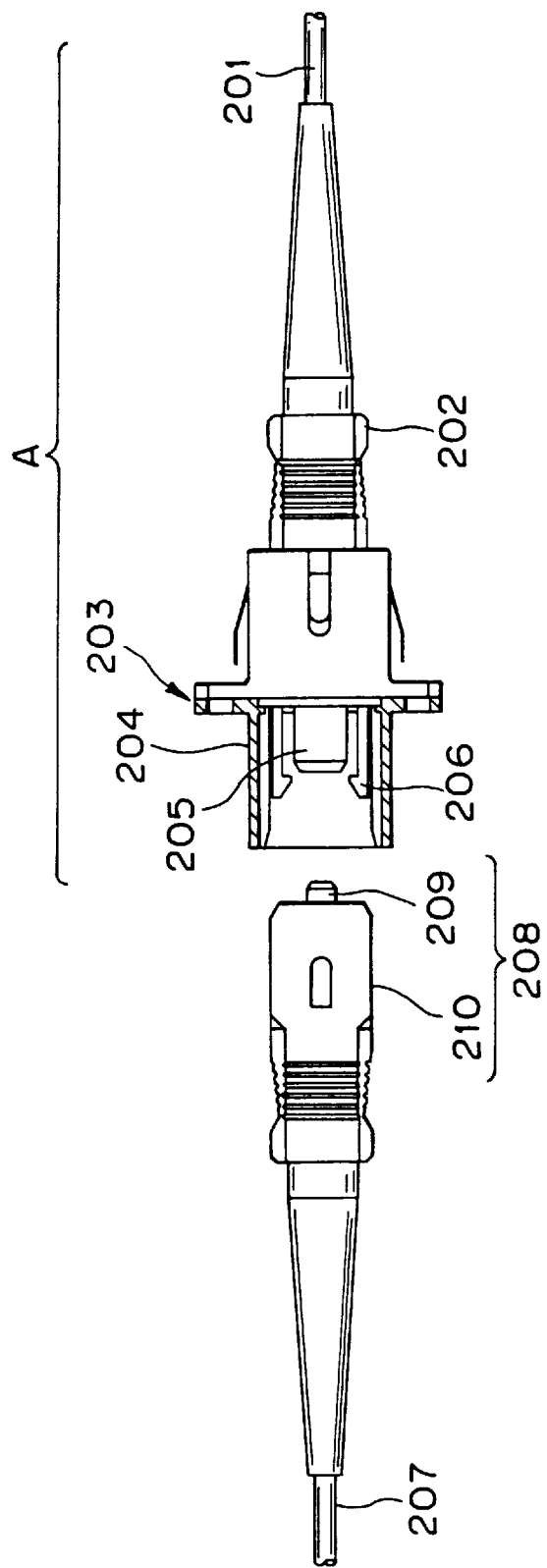
FIG. 2 is a partial cross sectional view showing a convention SC-type optical fiber connector.
Figure 3:
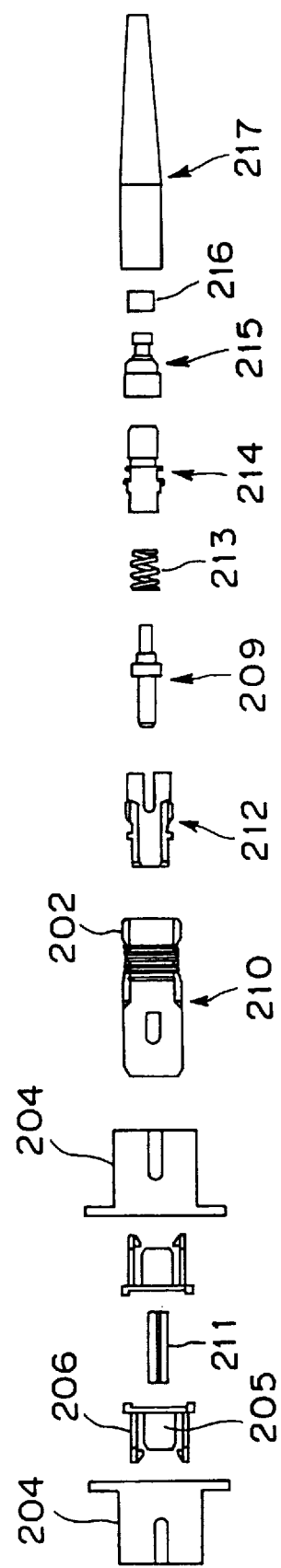
FIG. 3 is an exploded view showing a conventional SC-type optical adapter and a conventional SC-type optical fiber connector plug.
Figure 4:
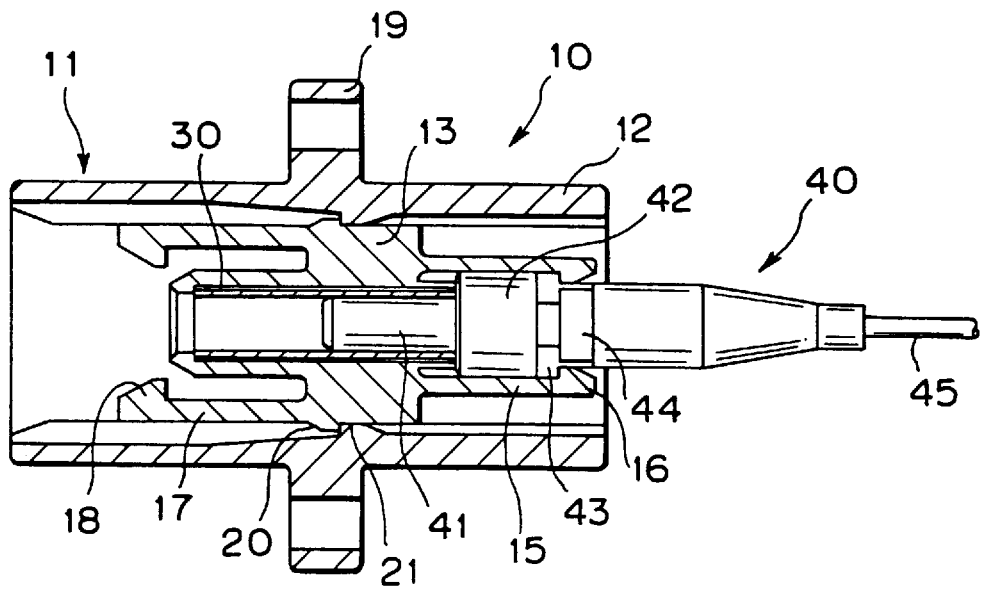
FIG. 4 is a vertical cross sectional view showing an optical receptacle according to an embodiment of the present invention (I—I cross section in FIG. 6)

According to the present invention, as shown in FIG. 4, no diaphragm is needed between the flange 42 of the first ferrule and the split sleeve 30. In this case, the split sleeve can reach to the foot of the flange of the first ferrule so that a shorter ferrule can be used, with the result that when ferrules are manufactured less grinding of the outer surfaces of the ferrule is required. Therefore, the optical receptacle can be manufactured at low cost.

Furthermore, when the first ferrule is taken out of the optical receptacle of the present invention, the split sleeve is drawn out simultaneously so that less friction occurs between the first ferrule and the split sleeve. Therefore, inexpensive materials with low friction resistance such as glass and plastics can be put in practical use for the ferrule.

DESCRIPTION OF PREFERRED EMBODIMENTS

Hereinafter, the present invention will be described in greater detail by embodiments with reference to the attached drawings. However, the present invention should not be construed as being limited thereto.

EMBODIMENT 1

Figure 5:
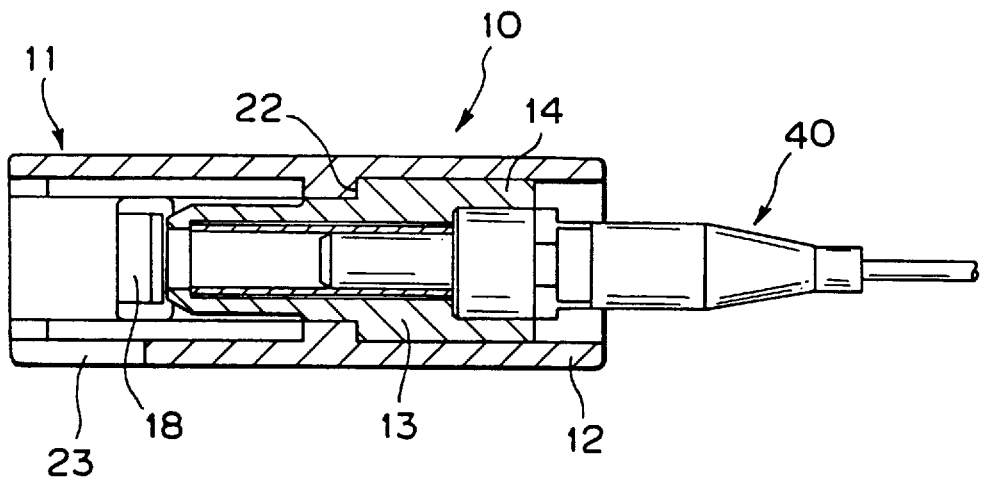
FIG. 5 is a horizontal cross sectional view showing an optical receptacle according to an embodiment of the present invention (II—II cross section in FIG. 6)

The optical receptacle according to the first embodiment of the present invention is designed to connect optical transmission components and for this purpose is attached to one of the components. As shown in FIGS. 4 and 5, an optical receptacle 10 includes a housing 11, a split sleeve 30 and a ferrule 40 to one end of which the split sleeve 30 is connected. The housing 11 is capable of containing the split sleeve 30 and a part of the ferrule 40.

The housing 11 is in form and includes an outer part 12 and an inner part 13 which is inserted into the outer part 12. At a terminal of the inner part 13 is provided a fitting portion 14 on whose inner surface a flange 42 of the first ferrule 40 fitted (FIG. 5). Above and below the fitting part 14 are arranged a pair of first hooks 15 having respective first claws 16 on the tips thereof. The first hooks 15 with the first claws 16 hold the flange 42 of the first ferrule 40 in position (FIG. 4).

Figure 12:
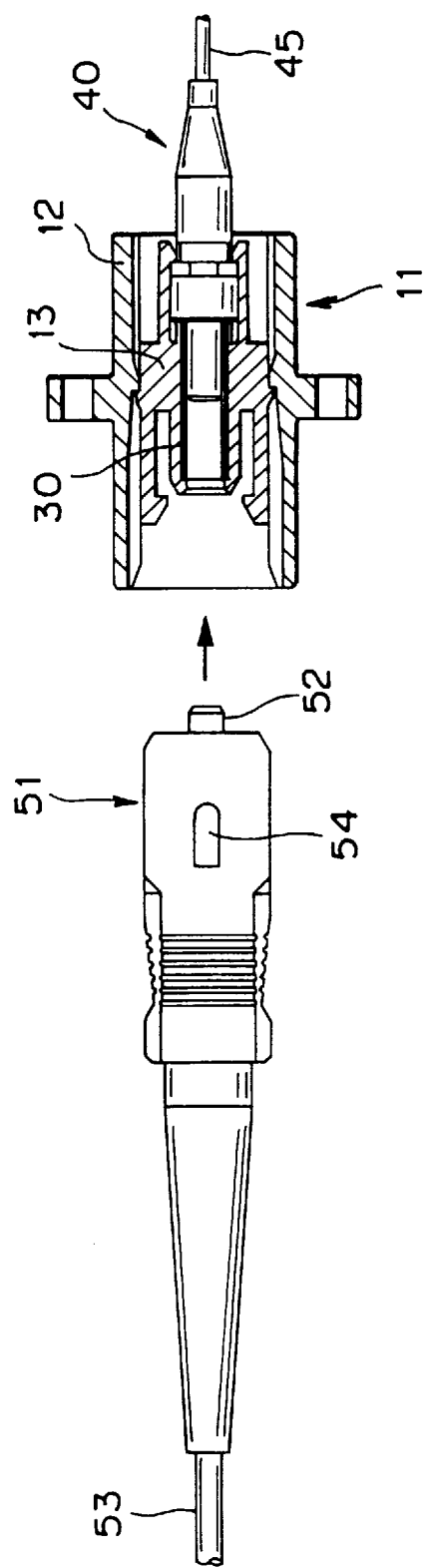
FIG. 12 is a partial cross sectional view showing an optical fiber connector and inner and outer parts as well as the first ferrule, illustrating the manner of in which she optical receptacle of the present invention is used.
Figure 13:
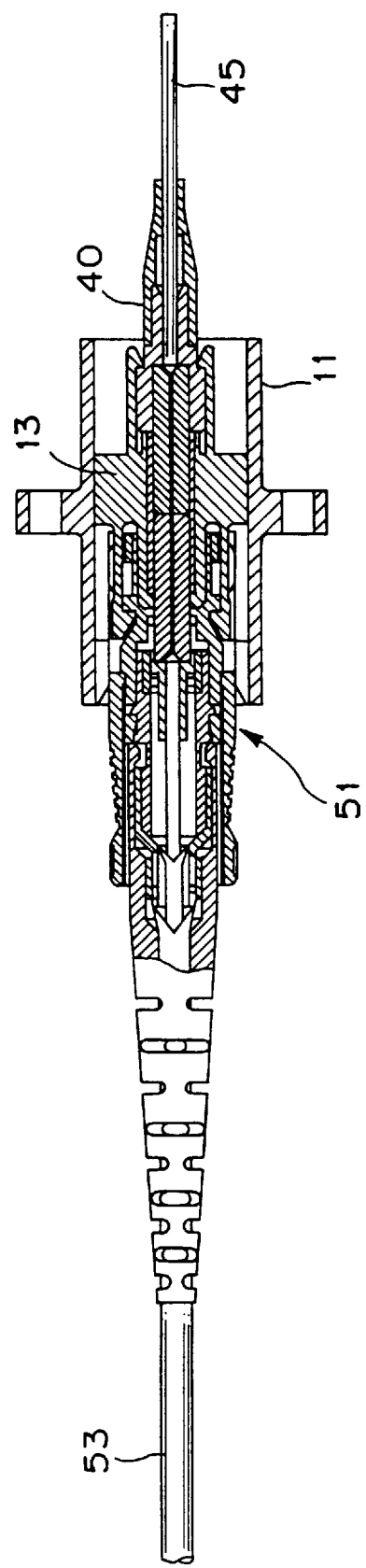
FIG. 13 is a cross sectional view showing an optical receptacle with a ferrule being inserted therein according to an embodiment of the present invention.

On the other hand, on the tip of the inner part 13 which is opposite to the side where the first ferrule 40 is to be fitted, there is provided a pair of second hooks having respective second claws on the tips thereof. The hooks 17 with the respective claws 18 serve as engaging portions for holding an optical fiber connector 51 (FIG. 12).

Figure 6:
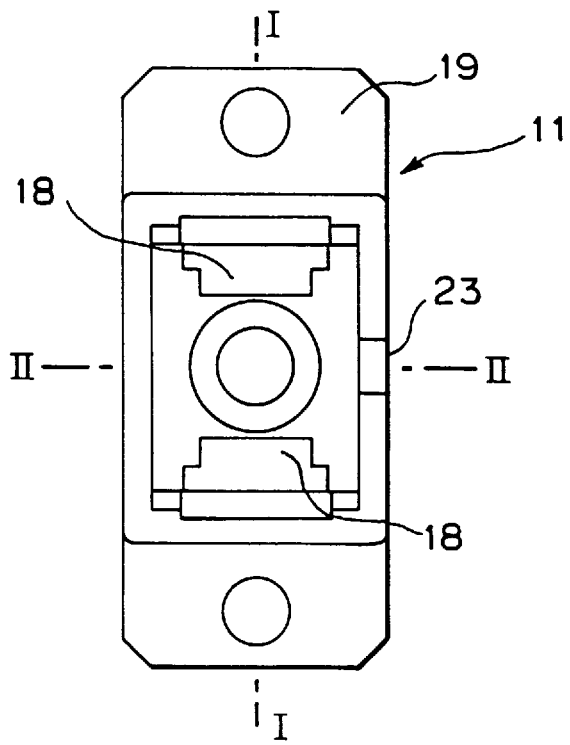
FIG. 6 is a left side view showing an optical receptacle.
Figure 7:
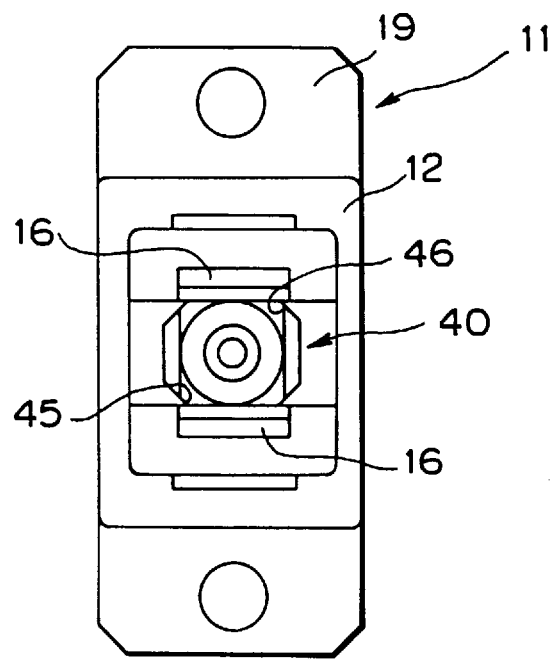
FIG. 7 is a right side view showing an optical receptacle.

On the top of the outer part 12 is formed a key way 23 for holding the optical, fiber connector 51 having a key 54 and receives the key 54 (FIGS. 5 and 6). In the central portion of the outer part 12 is provided a fitting flange 19 formed of fitting holes 24 through which screws or the like fitting means are inserted to fix the housing to an optical module (not shown) in position (FIGS. 4 and 6).

On the inner surface of the inner part 13 a split sleeve 30 is fitted. In the split sleeve 30 are fitted on one hand the first ferrule 41 which is fitted from the side of the bottom end of the inner part 13, or from right to left in FIG. 4, and on the other hand the second ferrule 52 of the optical fiber connector plug 51 to be connected (FIG. 12). Thus, the split sleeve 30 allow the first and second ferrules 40 and 52 to align in the axial direction (FIG. 12).

The inner part 13 having the above-described structure, which can be molded as an integral component, is inlayed in the outer part 12, which can be also molded as an integral part. Thus, the housing 11 is constructed.

Figure 8A:
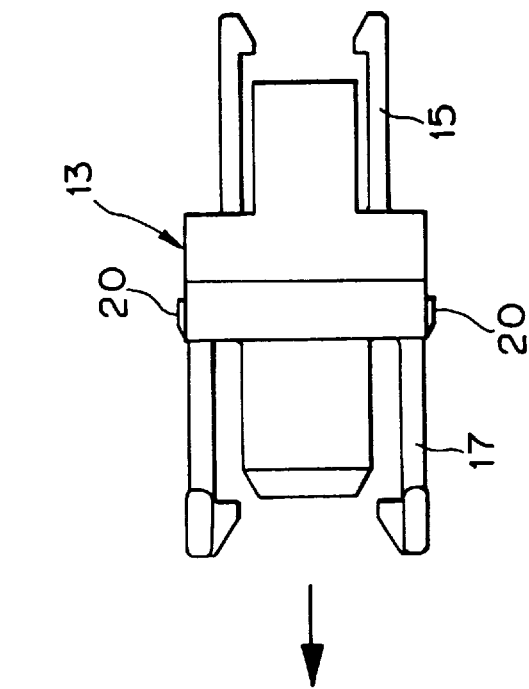
FIG. 8A is a side cross sectional view showing an inner part of an optical receptacle according to an embodiment of the present invention.
Figure 8B:
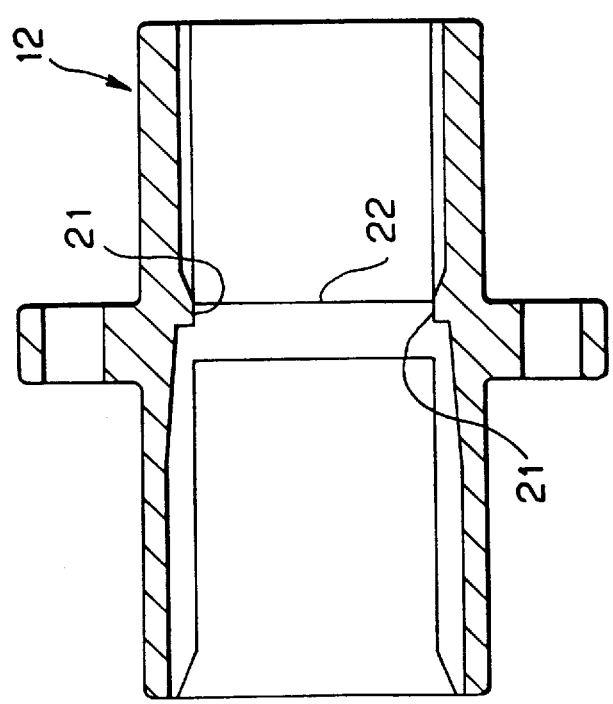
FIG. 8B a side cross sectional view showing an outer part of an optical receptacle according to an embodiment of the present invention.

As shown in FIG. 8A, the inner part 13 has first protrusions 20 on its upper and lower surfaces while the outer part 12 has on its inner surface a second protrusion 21 and a step 22.

The inner part 13 is inserted into the outer part 12 from the side of the base end of the housing 11 until the first protrusions 20 pass by the second protrusion 21 against an inward force urged to the inner part 13 by a slightly constricted inner diameter of the cavity. As soon as the first protrusions pass by the second protrusion 21, a portion of the inner part 13 abuts the step 22 provided on the inner surface of the outer part 12 and thus is fixed.

At the step 22, the inner part 13 and the outer part 12 contact each other along a sufficient are so that the inner part 13 will not come out of the outer part 12 if an excess or otherwise intolerable external force such as a tensile force is urged to the inner part 13. Therefore, there is no danger that the optical fiber connector plug 51 together with the inner part 13 and the first ferrule 40 is drawn out of the optical module to thereby break the device.

The first hooks 15 and second hooks 17 are molded integrally as the inner part 13. This construction is advantageous in that the relative positions of the first and second hooks can be set with higher precision and assembling operation is more simple as compared with the conventional method in which the both first and second hooks are fabricated separately and subsequently assembled as by ultrasonic welding.

Figure 9:
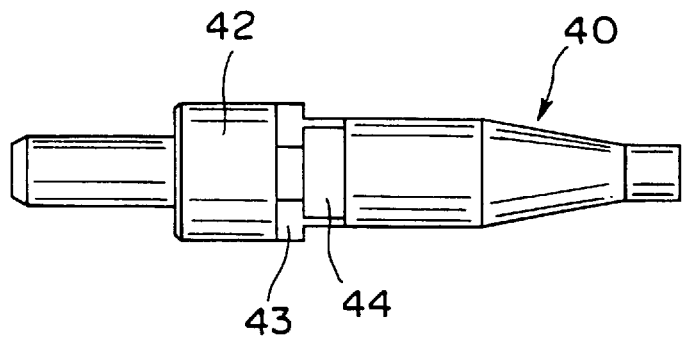
FIG. 9 is a side view showing the first ferrule of an optical receptacle according to an embodiment of the present invention.
Figure 10:
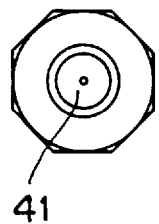
FIG. 10 is a left end view of the first ferrule of an optical receptacle according to an embodiment of the present invention.
Figure 11:
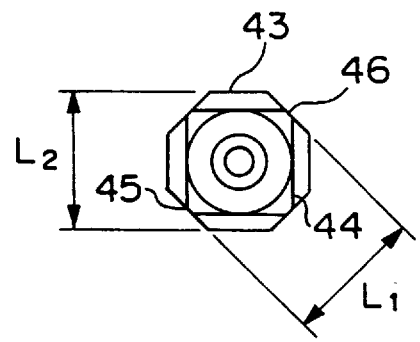
FIG. 11 is a right end view of the first ferrule of an optical receptacle according to an embodiment of the present invention.

As shown in FIGS. 9 to 11, the flange 42 of the first ferrule.40 is configured to a shape of a combination of an octagonal prism 43 coaxially connected to a tetragonal prism 44. As shown in FIG. 4, the distance between two opposing parallel surfaces of the tetragonal prism 44 is made smaller than the distance between the second claws 16 themselves. As a result, when the first ferrule 40 is engaged with the housing 11, the hooks 15 are closed, that is, come nearer to each other so that the claws 16 engage with the octagonal prism 43 to hold the ferrule 40 or prevent rearward movement of the ferrule 40 which leads to detachment of the ferrule 40.

Referring to FIG. 11, it is assumed that the diagonal line of the tetragonal prism 44 has a length of $L_1$ while the distance between the parallel two surfaces of the octagonal prism is $L_2$. When the length, $L_1$, of the diagonal line of the tetragonal prism 44 is the same as or slightly larger than the distance, $L_2$, the opposite end points 45 and 46 of the diagonal line contact the inner surface of the first claws 16 when the ferrule 40 is rotated about its longitudinal axis at angles of 45° so that the distance between the opposing first claws 16 is made greater than the two parallel surfaces of the octagonal prism. As a result, the first ferrule 40 is released and can be readily put out of the inner part 13 of the optical receptacle 10. In this case, if the first ferrule 40 is rotated under the conditions that the second ferrule 52 still contacts on its end surface the end surface of the first ferrule 40, the end surface of the optical fiber in the ferrule tends to be damaged. Accordingly, when the second ferrule 52 is to be taken out of the inner part 13, care must be taken to check to see if the optical fiber , connector plug is disconnected from the optical receptacle of the present invention.

Connection of optical transmission components to each other through the optical receptacle 10 according to the first embodiment of the present invention can be achieved by inserting the optical fiber connector plug 51 into the optical receptacle 10 from its left hand side as seen in FIG. 12 so that the optical fiber 45 fitted to the first ferrule 40 and the optical fiber cable 53 fitted to the second ferrule 52 are aligned.

EMBODIMENT 2

This embodiment is the second embodiment of the optical receptacle of the present invention.

Figure 14:
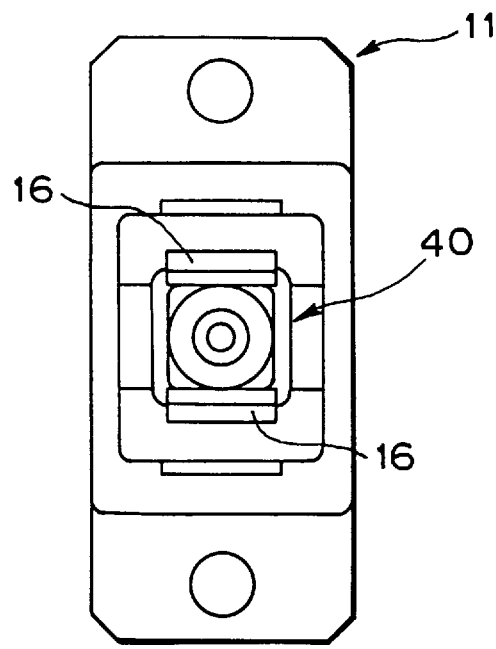
FIG. 14 a right end view showing an optical receptacle according to a second embodiment of the present invention.
Figure 15:
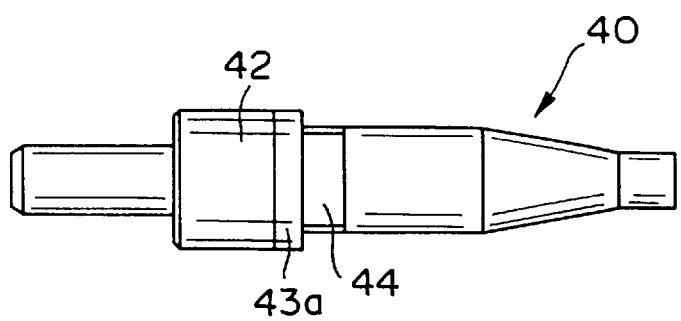
FIG. 15 is a side view showing the first ferrule which is connected to an optical receptacle according to a second embodiment of the present invention.
Figure 16:
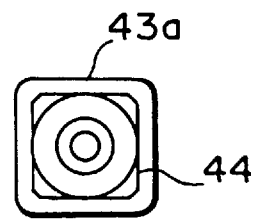
FIG. 16 is a right end view showing the first ferrule which is connected to an optical receptacle according to a second embodiment of the present invention.

FIG. 14 is an right end view showing an optical receptacle according to the second embodiment of the present invention. FIG. 15 is the first ferrule according to the first embodiment of the present invention. FIG. 16 is a right end view showing the first ferrule shown in FIG. 15.

The optical receptacle according to this embodiment differ from that of the first embodiment of the present invention in the configuration of the flange. The first ferrule 40 in the present embodiment has a flange 43a which engages with the first claws 16 and is of a tetragonal prism instead of the octagonal prism that is used in the first ferrule according to the first embodiment of the present invention as shown in FIG. 9.

With this construction, the ferrule according to this embodiment of the present invention cannot rotate unlike the first ferrule according to the first embodiment of the present invention described above and, hence, the first ferrule with the tetragonal flange 43a cannot be taken out of the housing 11 by a mere operation, such as rotation about its longitudinal axis, of the first ferrule 40 itself. For releasing the first ferrule 40, the flange 43a must be disengaged from the first claws 16 of the first hooks 15. This can be achieved by broadening the gap between the first claws 16 by a suitable means. In order to broaden the gap between the claws 16 to release the engagement of the ferrule 40 with the inner part 13, a jig in the form of a plate, for example can be inserted in the gap between one of the claws 16 and the tetragonal prism 44. The jig may be of any desired shape as far as it has two plate-like members such as the plates described above. Alternatively, commonly available tools such as tweezers may also be used for the disengagement of the ferrule from the inner part 13 of the optical receptacle according to this embodiment of the present invention.

With the arrangement according to this embodiment, even if the optical fiber connector is not removed from the optical receptacle by negligence or for some other reasons, the first ferrule 40 never rotates around its longitudinal axis so that no erroneous or harmful operation can occur such that the end face of the optical fiber is damaged by rotation of the first ferrule 40 which contacts the end face of the optical fiber.

EMBODIMENT 3

Figure 17:
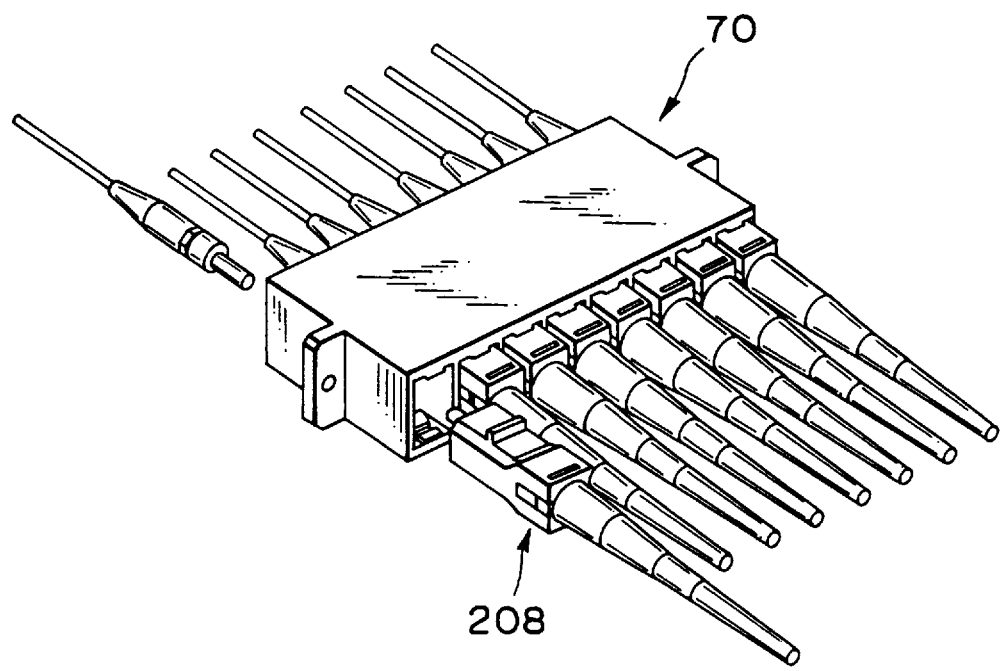
FIG. 17 is a schematic perspective view showing an eight-element array optical receptacle according to a third embodiment of the present invention.

FIG. 17 is a schematic perspective view showing an eight-component-array optical receptacle comprising eight receptacles according to the first embodiment of the present invention integrally assembled side by side. The configurations of the first and second ferrules are the same as those of the first and second ferrules in the optical receptacle according to the first or second embodiment of the present invention. The array housing 70 is an integrally molded article comprising eight single housings integrally combined arranged in parallel side by side.

In this case, the inner part 13 may be the same as that used in the optical receptacle 10 according to the first embodiment of the present invention. Accordingly, it is sufficient to change the configuration of only the outer part that is simple in structure and inexpensive. Therefore, the optical receptacle according to this embodiment can be realized at low costs as compared with the case where the entire structure has to be newly produced.

Alternatively, eight-component-array optical receptacle may be realized as a compact article using as an optical fiber connector plug to be connected a high density type SC connector plug 208a having a structure in which the plug is removed with a jig or removing tool after the coupling device is detached from the SC-type optical fiber connector plug.

EMBODIMENT 4

This embodiment relates to the manufacture of the housing of the optical receptacle according to any one of EMBODIMENT 1 TO 3 above.

Figure 18:
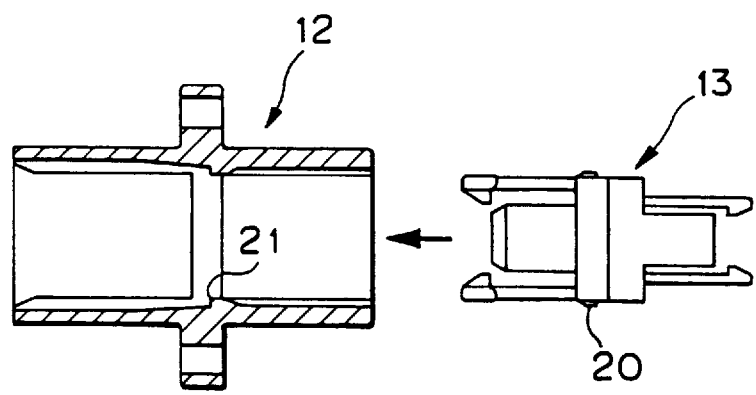
FIG. 18 is a cross sectional view showing inner and outer parts of an optical receptacle to be assembled, illustrating the step of manufacturing an optical receptacle according to an embodiment of the present invention.

FIG. 18 is a cross sectional view showing inner and outer parts of an optical receptacle to be assembled, illustrating the step of manufacturing the housing of an optical receptacle according to any one of the foregoing embodiments of the present invention. AS shown in FIG. 18, the outer part 12 and the inner part 13 which are components of the housing 11 are separately prepared as integral molded articles, respectively. Then, the inner part 13 is inserted in the outer part 12 until the protrusions 21 provided in the inner surface of the outer part 12 engage with the protrusions 20 of the inner part 13 so that the inner part 13 is held fixedly in the outer part 12. The housing thus formed requires no further operation such as ultrasonic welding for bonding these components before it is assembled with the same first ferrule used in the optical receptacle according to any one of the foregoing embodiments.

The present invention has been described in detail with respect to an embodiment, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A method for manufacturing an optical receptacle which comprises:

a housing having a base end and a nose end, said housing comprising an inner part and an outer part having fixed therein said inner part; and a first ferrule fitted to the base end of said housing;

wherein said inner part comprises:

a sleeve for fitting with alignment to said first ferrule and a second ferrule in an optical fiber connector to be connected to the nose end of said housing;

first hook portions for holding said first ferrule provided at the base end of said housing; and second hook portions for holding said optical fiber connector plug at a fitting position of said optical fiber connector plug;

said first and second hook portions being parts of an integral molded article;

wherein the method comprises the steps of:

providing the inner part having the first hook portions and the second hook portions as the integral molded article;

providing an outer part adapted for holding said inner part therein;

inserting said inner part in said outer part to form the housing; and fitting the first ferrule to the base end of said housing.

2. A method for manufacturing an optical receptacle which comprises:

a housing having a base end and a nose end, said housing comprising an inner part and an outer part having fixed therein said inner part; and a first ferrule fitted to the base end of said housing;

wherein said inner part comprises:

a sleeve for fitting with alignment to said first ferrule and a second ferrule in an optical fiber connector to be connected to the nose end of said housing;

first hook portions for holding said first ferrule provided at the base end of said housing; and second hook portions for holding said optical fiber connector plug at a fitting position of said optical fiber connector plug;

said first and second hook portions being parts of an integral molded article;

wherein the method comprises inserting said inner part in said outer part until a fixing mechanism provided in said housing fixes said inner part in position in said outer part.

3. A method for manufacturing a housing for an optical receptacle which comprises:

a housing having a base end and a nose end, said housing comprising an inner part and an outer part having fixed therein said inner part; and a first ferrule fitted to the base end of said housing;

wherein said inner part comprises:

a sleeve for fitting with alignment to said first ferrule and a second ferrule in an optical fiber connector to be connected to the nose end of said housing;

first hook portions for holding said first ferrule provided at the base end of said housing; and second hook portions for holding said optical fiber connector plug at a fitting position of said optical fiber connector plug;

said first and second hook portions being parts of an integral molded article;

wherein the method comprises the steps of:

providing the inner part having the first hook portions and the second hook portions as the integral molded article;

providing an outer part adapted for holding said inner part therein; and inserting said inner part in said outer part to form a housing.

4. A method for manufacturing a housing for an optical receptacle, having a base end adapted for fitting a first ferrule and a nose end adapted for fitting an optical fiber connector plug, said housing comprising:

an inner part; and an outer part having fixed therein said inner part;

wherein said inner part comprises:

first hook portions for holding said first ferrule provided at the base end of said housing; and second hook portions for holding said optical fiber connector plug at a fitting position of said optical fiber connector plug;

said first and second hook portions being parts of an integral molded article;

wherein the method comprises inserting said inner part in said outer part until a fixing mechanism provided in said housing fixes said inner part in position in said outer part.

* * * * *

UNITED STATES PATENT AND TRADEMARK OFFICE
CERTIFICATE OF CORRECTION

PATENT NO. : 5,887,095
DATED : March 23, 1999
INVENTOR(S) : NAGASE et al

It is certified that error appears in the above-identified patent and that said Letters Patent is hereby corrected as shown below:

ON THE TITLE PAGE, under Item [30] Foreign Application Priority Data, insert --March 8 1995 [JP] Japan 7-048061--.

Signed and Sealed this

Thirtieth Day of November, 1999

Attest:

Attesting Officer

Q. TODD DICKINSON

Acting Commissioner of Patents and Trademarks